US008108295B2

(12) United States Patent
Bok et al.

(10) Patent No.: US 8,108,295 B2
(45) Date of Patent: **\*Jan. 31, 2012**

(54) DYNAMIC AGGRESSIVE/PASSIVE PEGGED TRADING

(75) Inventors: Tomas Bok, Concord, MA (US); Jose E. Gutierrez, Brooklyn, NY (US); Sam Shteingart, Brooklyn, NY (US)

(73) Assignee: ITG Software Solutions, Inc., Culver City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/724,131

(22) Filed: Mar. 15, 2010

(65) Prior Publication Data

US 2010/0174637 A1     Jul. 8, 2010

Related U.S. Application Data

(63) Continuation of application No. 10/376,600, filed on Mar. 3, 2003, now Pat. No. 7,680,722.

(51) Int. Cl.
*G06Q 40/00* (2006.01)

(52) U.S. Cl. .................... 705/37; 705/36 R; 705/35

(58) Field of Classification Search ............... 705/35–45
See application file for complete search history.

(56) References Cited

U.S. PATENT DOCUMENTS

| | | | | |
|---|---|---|---|---|
| 5,101,353 A * | 3/1992 | Lupien et al. | ............. | 705/37 |
| 5,297,032 A * | 3/1994 | Trojan et al. | ............. | 705/37 |
| 6,343,278 B1 * | 1/2002 | Jain et al. | ............. | 705/36 R |
| 6,401,080 B1 * | 6/2002 | Bigus et al. | ............. | 705/37 |
| 6,418,419 B1 * | 7/2002 | Nieboer et al. | ............. | 705/37 |
| 6,493,682 B1 * | 12/2002 | Horrigan et al. | ............. | 705/36 R |
| 6,963,856 B2 * | 11/2005 | Lutnick et al. | ............. | 705/37 |
| 7,024,387 B1 * | 4/2006 | Nieboer et al. | ............. | 705/37 |
| 7,158,951 B2 * | 1/2007 | Stark | ............. | 705/37 |
| 7,212,999 B2 * | 5/2007 | Friesen et al. | ............. | 705/37 |
| 7,308,428 B1 * | 12/2007 | Federspiel et al. | ........ | 705/36 R |
| 7,356,500 B1 * | 4/2008 | Waelbroeck et al. | ....... | 705/37 |
| 7,379,909 B1 * | 5/2008 | Cruz et al. | ............. | 705/35 |
| 7,558,754 B1 * | 7/2009 | Singer et al. | ............. | 705/37 |
| 7,613,647 B1 * | 11/2009 | Cushing et al. | ............. | 705/37 |

(Continued)

FOREIGN PATENT DOCUMENTS

EP    1429270 A1    6/2004

(Continued)

OTHER PUBLICATIONS

ITG, "Introducing SPI, the Newest SmartServer from ITG," Spring 2000, ITG Connect.*

(Continued)

*Primary Examiner* — Alexander Kalinowski
*Assistant Examiner* — Ann Loftus
(74) *Attorney, Agent, or Firm* — Rothwell, Figg, Ernst & Manbeck, P.C.

(57) ABSTRACT

A computer-implemented system and method for executing trades of financial securities according to a combination passive/aggressive trading strategy that reliably executes trades of lists of securities or blocks of a single security within a desired time frame while taking advantage of dynamic market movement to realize price improvement for the trade within the desired time frame. A passive trading agent executes trades at advantageous prices by floating portions of the order at the bid or ask to maximize exposure to the inside market and attract market orders. An aggressive agent opportunistically takes liquidity as it arises, setting discretionary prices in accordance with historical trading data of the specified security.

6 Claims, 12 Drawing Sheets

U.S. PATENT DOCUMENTS

| | | | |
|---|---|---|---|
| 2001/0032163 A1* | 10/2001 | Fertik et al. | 705/37 |
| 2002/0010672 A1* | 1/2002 | Waelbroeck et al. | 705/37 |
| 2002/0052816 A1* | 5/2002 | Clenaghan et al. | 705/36 |
| 2002/0052824 A1* | 5/2002 | Mahanti et al. | 705/37 |
| 2002/0052827 A1* | 5/2002 | Waelbroeck et al. | 705/37 |
| 2002/0073017 A1* | 6/2002 | Robertson | 705/37 |
| 2002/0178104 A1* | 11/2002 | Hausman | 705/37 |
| 2003/0033235 A1* | 2/2003 | Hummelgren | 705/37 |
| 2003/0069834 A1* | 4/2003 | Cutler | 705/37 |
| 2003/0088499 A1* | 5/2003 | Gilbert et al. | 705/37 |
| 2003/0093343 A1* | 5/2003 | Huttenlocher et al. | 705/35 |
| 2003/0120585 A1* | 6/2003 | Rosenblatt | 705/37 |
| 2003/0233306 A1* | 12/2003 | Madhavan et al. | 705/37 |
| 2004/0024690 A1* | 2/2004 | Satow et al. | 705/37 |
| 2004/0030632 A1* | 2/2004 | Hausman | 705/37 |
| 2004/0034591 A1* | 2/2004 | Waelbroeck et al. | 705/37 |
| 2004/0078317 A1* | 4/2004 | Allen et al. | 705/37 |
| 2004/0143538 A1* | 7/2004 | Korhammer et al. | 705/37 |
| 2004/0210511 A1 | 10/2004 | Waelbroeck et al. | |
| 2006/0026090 A1* | 2/2006 | Balabon | 705/37 |
| 2009/0125448 A1* | 5/2009 | Borkovec et al. | 705/36 R |

FOREIGN PATENT DOCUMENTS

WO    WO 2004/068272 A2    12/2004

OTHER PUBLICATIONS

Keim, Donald and Madhavan, Ananth, Anatomy of the Trading Process: Empirical Evidence on the Behavior of Institutional Traders, 1995, Journal of Financial Economics 37, pp. 371-398.*

Chapman, Peter, Direct Access in Hard Retail Times a new Turn for Hedgies and Money Managers, Sep. 1, 2002, Traders Magazine, p. 1.*

Chapman, Peter, A Speedy New Execution Player? Sonic Trading is Ready for a Dog Eat Dog World, Sep. 1, 2002, p. 1.*

Keim, Donald and Madhavan, Ananth, Anatomy of the Trading Process: Empirical Evidence on the Behavior of Institutional Traders, 1995, Jornal of Financial Economics 37, pp. 371-398.

Market Trading Tactics: Beating the Odds through Technical Analysis and Money Management, Guppy, Daryl, John Wiley and Sons, 1997, pp. 252-263.

* cited by examiner

DYNAMIC AGGRESSIVE/PASSIVE PEGGED TRADING

CROSS REFERENCE TO RELATED APPLICATION

This application is a Continuation of U.S. application Ser. No. 10/376,600, filed on Mar. 3, 2003, now U.S. Pat. No. 7,680,722, the entire disclosures of which are incorporated herein by reference.

FIELD OF THE INVENTION

This invention relates generally to securities markets. Particularly, the invention relates to a system and method for executing trades of financial securities according to a combination passive/aggressive trading strategy that reliably executes trades of lists of securities or blocks of a single security within a desired time frame while taking advantage of dynamic market movement to realize price improvement for the trade along with completion within the desired time frame.

BACKGROUND OF INVENTION

A securities trading mechanism can be thought of as a set of protocols that translate the investors' latent demands into realized prices and quantities. Various automated trading systems are known, which execute so-called "program" trading strategies in response to market movements.

Any trading strategy can be classified as passive or aggressive, or a combination of both. Passive trading strategies rely on the use of limit orders. For instance, if an investor wishes to buy (sell) 1,000 shares of XYZ Company, the investor may specify a maximum (minimum) price at which she is willing to buy (sell). This price is known as the limit price, and the order will remain pending until a counter party agrees to trade shares with her at this price. Typically traders will set the limit price to be at or below the current bid price for buy orders, and at or above the current offer price for sell orders. In these cases, the investor passively waits for the market to move in her favor and for her limit price to be accepted by a counter party. Such an approach gives the trader total control over her execution price, but no control over when, if ever, her order will execute. Thus passive strategies are not consonant with a requirement of immediacy or with a requirement that trading of all shares be completed within a given time "horizon" or period of time.

Market orders (or limit orders with marketable prices, such as a buy order with limit price equal to or above the current ask) are the building blocks of an aggressive strategy. A market order allows the trader to receive an immediate execution, but the trader loses control over the execution price. Large market orders pose a unique problem because there may not be enough interest at the quoted market price to satisfy the complete order size. In this case, the execution may result in substantial market impact: a worsening of the execution price relative to the current quoted market price. For example, the lowest current sell offer for ABC Company may be $10 with 400 shares for sale at that price. A market order to buy 100 shares is likely to execute at $10 exactly, but a larger market order for 10,000 shares may execute at an average price of $10.25, which is significantly higher than the current quote at the time the order was entered. The trader who submits such a market order has paid a substantial premium for the right to execute immediately.

Large institutional investors such as mutual funds, hedge funds, etc. face a dilemma On the one hand, they are trading large blocks of stock and cannot afford to send large market orders that will result in market impact and inferior execution prices. On the other hand, they require a certain degree of immediacy to complete their trades within a defined time horizon. Thus neither a purely passive or purely aggressive approach is appropriate for institutional traders. This leads them to seek out compromise strategies that use a blended passive-aggressive approach.

One such strategy in the prior art is a pegged order. A pegged order, unlike a conventional limit order, automatically corrects its price according to movements in the quoted price. Typically a pegged buy order would be pegged to the bid, meaning that the order price is automatically adjusted to match the current quoted bid price. As counter parties (sellers) place market orders, those orders will execute first against the orders posted at the bid. By automatically maintaining an order price exactly at the bid, the pegged buy order is staying competitive relative to other passive buyers and therefore increasing the likelihood of an execution at a favorable price. Pegging is particularly useful in liquid stocks and fast-moving markets where quoted prices are continuously changing.

Another blended strategy is the discretion order. Discretion orders are basically just regular limit orders, except that they introduce a second limit price. This second price (called the discretion price) is the price at which the trader is willing to execute a trade aggressively. For example, consider a $10.00-$10.10 market, meaning that the current quoted bid is $10.00 and the current quoted offer or ask is $10.10. A trader issues a buy limit order at $10 with a $10.05 discretion price. This order will function as a normal limit order, posting the shares at $10, giving the order a chance of executing at a favorable $10 price if an aggressive seller agrees to sell at this price. But, if the current quoted offer price should ever fall to $10.05 or less, the order will automatically convert to an aggressive order at $10.05. With a discretion order, the trader maintains all of the benefits of a regular limit order (the ability to control execution price and the possibility of saving 10 cents relative to the likely execution price of a market order) but with an increased likelihood of execution. It is a selectively aggressive strategy in that it trades aggressively only when it is cheapest to do so, i.e. when spreads (the difference between the bid and ask) are narrow.

Pegging and discretion can be combined to make a third blended strategy. For example, our trader could issue a buy order pegged to the bid with a 5 cent discretion range. This automatically adjusts the order price so that it always is equal to the current bid, and also automatically adjusts the discretion price so that it is always five cents above the current bid. Thus the order receives all of the pegging advantages (staying competitive with other passive buyers) with all of the discretion advantages (ability to selectively trade aggressively in order to increase the probability of execution).

One way to think about a pegging-with-discretion strategy is that the order is being traded by two independent trading agents. A passive agent maintains an open limit order and automatically adjusts its limit price to match movements in the market. An aggressive agent watches the width of the spread and trades aggressively whenever the spread is narrow. The passive agent is constantly trying to "earn the spread" by attracting market orders from counter parties. The aggressive agent is waiting for opportunities to "pay the spread" but only when it is least expensive to do so. The discretion range (the distance in cents between the limit price and the discretion price) is a measure of the aggressiveness of the strategy. If the discretion range is 0, then the aggressive agent will never trade a share, while if the discretion range is set very high then most if not all of the order will be traded by the aggressive agent.

The concept of the pegging-with-discretion strategy is potentially quite powerful, but the known embodiments of the pegging-with-discretion strategy have a number of drawbacks. First, a strategy of instantaneously adjusting the order price to match quote changes will contribute to momentum that disadvantages the order. For example, say that the current bid/ask for ABC Company is $10/$10.10. Five buyers may place 1,000 share buy orders each pegged to the current bid. All of these orders thus are displayed with a $10.00 price. If a single day-trader submits a 100 share buy order at a $10.09 price, all five pegged buyers will immediately change their prices to $10.09 to match this new buyer. Any sellers watching the market may observe this sudden shift in demand, and may perceive this to be an indication of strong buying interest, in which case the sellers are likely to shift their asking prices higher accordingly. So a day-trader with a very small order has single-handedly moved the market by almost 1%. Moreover, since all five buyers are pegged to each other's bid price, these pegged buyers will never lower their price, only ratchet it higher.

A second drawback is the danger of a pegged strategy giving itself away. Using the example with the five buyers, anyone paying attention to this market is likely to notice the immediate, correlated movements of the five buyers, and it is not difficult to guess that these buyers are employing pegging strategies. This exposes the pegged strategies to exploitation by sellers. Any time a trader uses a systematic strategy for trading, it is imperative that she avoid tipping off other market participants to her strategy.

A third drawback of a pegging-with-discretion strategy is that discretion is cumbersome for traders to use appropriately. To be used effectively, a discretion range should be based on the current market conditions, the historical average bid-ask spread, and the trader's desired urgency for completing the order. The more stocks an investor is trading simultaneously, the more difficult it is to use discretion effectively since the discretion ranges must be set independently for each stock.

Fourth, the discretion range is static, and cannot respond to real-time changes in urgency. As described above, the discretion range is a measure of the aggressiveness of the strategy. It would be advantageous to adjust this discretion range based on the progress of the trade. Typically, a trader will have some notion of an expected time horizon associated with each trade: the expected time it will take for the market to absorb the full size of the trade, given the desired trading strategy. If a trade is progressing faster than expected, it would make sense to narrow the discretion range (i.e., to reduce the aggressiveness of the strategy), while it makes sense to increase the discretion range in cases where the trade progress is falling behind schedule. Since the known forms of discretion (or pegging-with-discretion) orders use a static discretion range, the only way to adjust the discretion range based on progress would be for the trader to make manual corrections. Again, this is cumbersome, particularly when the trader is working a large number of orders simultaneously.

Finally, the pegging, discretion, and pegging-with-discretion order types implemented by ECNs (Electronic Communication Networks) are fairly inflexible, with very limited ability for investors to tailor the strategies based on their individual trading style.

Thus there exists a need in the art for improvements to the known passive/aggressive blended trading strategies as implemented by the above pegging, discretion, and pegging-with-discretion strategies.

SUMMARY OF THE INVENTION

The present invention provides a method and system for trading securities using a dynamic passive/aggressive trading strategy that delivers reliable execution over a pre-specified time horizon. The dynamic trading strategy uses two distinct automated trading agents working in tandem: a passive agent trades passively, floating portions of an order with the bid or offer to obtain favorable prices. An aggressive agent trades opportunistically, using carefully-timed orders at marketable prices to keep the overall trade on schedule.

In particular, the invention provides a computer-implemented method of implementing an order to trade on an exchange a specified number of shares of a specified security within a specified time horizon, including the steps of sending to the exchange a first partial order to trade the security having a peg order price, the peg order price being correlated to a current quote on the exchange for the same trading side as the order, and a peg size, the peg size being correlated to a size of the quote, the peg order price and peg size of said partial order further being modified according to the specified time horizon; and sending to the said exchange a second partial order to trade the security having a price set at a predetermined amount better than the current quote for the same side as the order, wherein the predetermined amount is automatically calculated based on historical trading data for the specified security and based on the ratio of order completion with respect to the specified time horizon.

According to another aspect of the invention, a computer-implemented system for implementing an order to trade on an exchange a specified number of shares of a specified security within a specified time horizon includes a server that receives the order over an electronic communication medium, and processes the order by using an automated passive trading agent which sends to the exchange a first partial order having a price correlated to a current quote on the exchange for the same trading side as the order, and having a size being correlated to a size of the quote, and by using an automated aggressive trading agent which calculates a discretion range based on historical trading data and the ratio of order completion with respect to the specified time horizon, and then sends to the exchange a second partial order priced equal to or better than the opposite side of the current quote, when the current bid-ask spread is less than the calculated discretion range.

The present invention will become more fully understood from the forthcoming detailed description of preferred embodiments read in conjunction with the accompanying drawings. Both the detailed description and the drawings are given by way of illustration only, and are not limitative of the present invention as claimed.

DETAILED DESCRIPTION OF THE PREFERRED EMBODIMENTS

Figure 1:
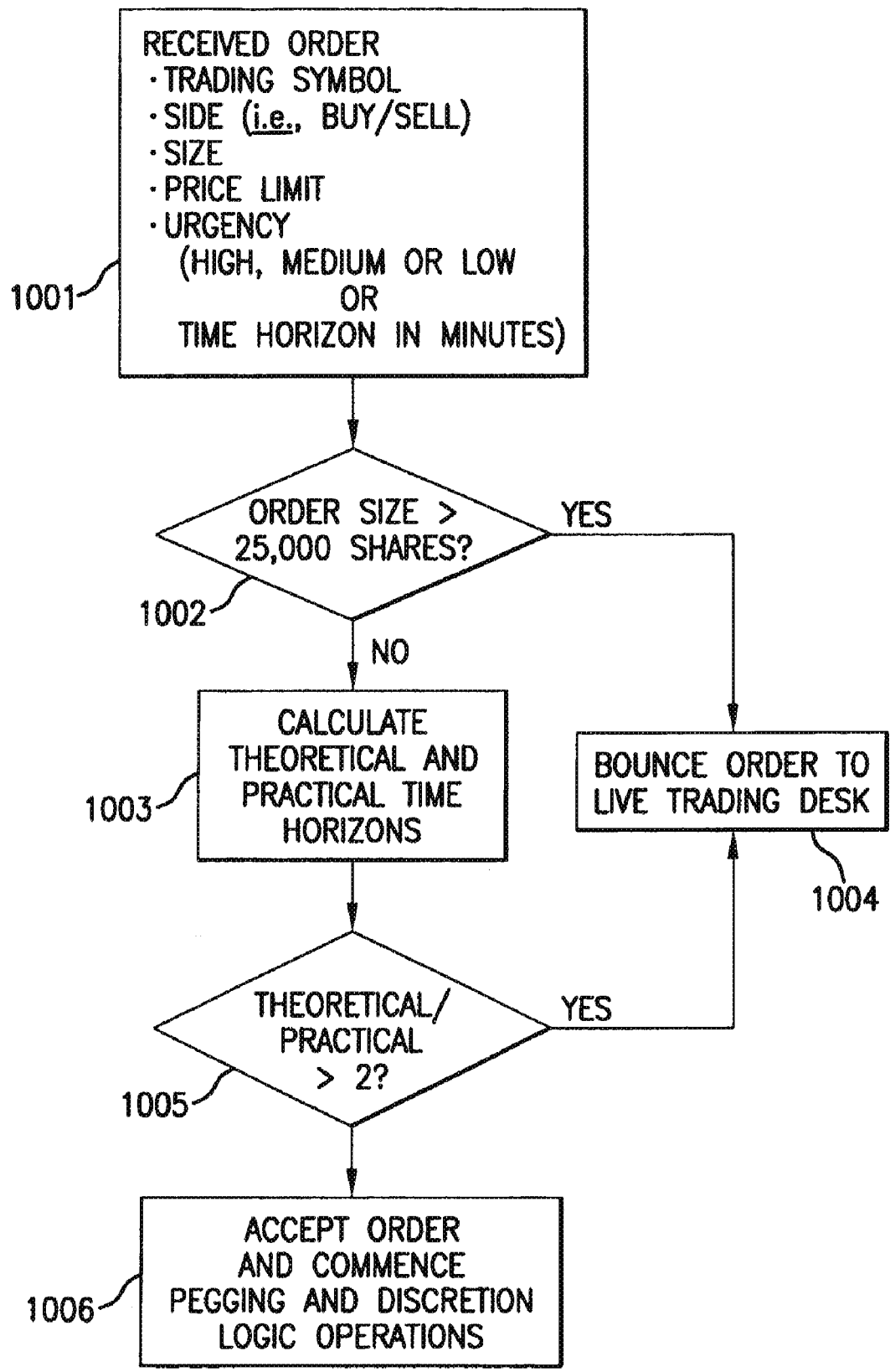
FIG. 1 is a flow diagram of a procedure for determining whether a received order is suitable for the active passive/aggressive trading strategy according to the present invention.

Prior to describing the invention, the following definitions of terms used hereinafter are provided:

BID=current national best quoted bid price across all markets that trade the symbol and publish electronic quotes ASK=current national best quoted ask price across all markets that trade the symbol and publish electronic quotes BID SIZE=current size quoted at BID, aggregated across all markets that trade the symbol and publish electronic quotes ASK SIZE=current size quoted at ASK, aggregated across all markets that trade the symbol and publish electronic quotes

SPREAD=ASK−BID

MARKETABLE PRICE=ASK for buy orders, =BID for sell orders

SAME SIDE DEPTH=BID SIZE for buy orders, =ASK SIZE for sell orders

OPPOSITE SIDE DEPTH=ASK SIZE for buy orders, =BID SIZE for sell orders

MORE AGGRESSIVE: for buy orders, price x is 'more aggressive' than price y if x>y. For sell orders, price x is 'more aggressive' than price y if x<y.

MORE PASSIVE: for buy orders, price x is 'more passive than price y if x<y. For sell orders, price x is 'more passive than price y if x>y.

DEPTH AHEAD: The depth ahead of an order is the current aggregated quoted size at all price levels MORE AGGRESSIVE than the order price, counting only quoted size on the same side (buy or sell) of the market.

ALONE AT THE INSIDE MARKET: an order is ALONE at the inside market if the order price=the BID (buy orders) or ASK (sell orders) and SAME SIDE DEPTH=order size.

The present invention involves several improvements to the known pegging-with-discretion order type as described above. Like the pegging-with-discretion strategy, the invention uses two automated trading agents to trade the order, one of which is passive and one of which is aggressive. In place of the known pegging strategy, the passive agent uses an enhanced form of pegging that avoids contributing to adverse price momentum, and also disguises its behavior to avoid exposing the automated nature of the strategy to other market participants. The passive agent achieves the objective of maintaining a competitive order at the inside market without the negative consequences associated with the conventional simple pegging strategy. The aggressive agent also has a number of important enhancements. The discretion range (the key measure of aggressiveness for the order) is automatically set to an appropriate level (given historical analysis of the trading symbol) and this range is then automatically adjusted dynamically throughout the lifespan of the order. As shares fill, as time elapses, and as market conditions change in real time, the invention automatically and continuously adjusts the discretion range according to urgency. The aggressive agent's responsibility is to keep the trade on schedule and to minimize risk. If the passive agent has been successful at achieving fills at advantageous prices then the aggressive agent will play a limited role during the trade; but if the passive agent has not been successful and the trade is falling behind schedule, then the aggressive agent intervenes to ensure that the trade will complete on time.

The passive and aggressive agents are combined together in a computer server to provide a complete order type that delivers the power of the passive-aggressive trading approach in a convenient package. Instead of requiring traders to manually set all order parameters associated with pegging and discretion, this combined order type requires only an urgency score (such as for example "high," "medium" or "low") or a specific time horizon for completion of the order. Given the urgency allocated to each order, the two automated trading agents work together to execute the order.

Figure 12:
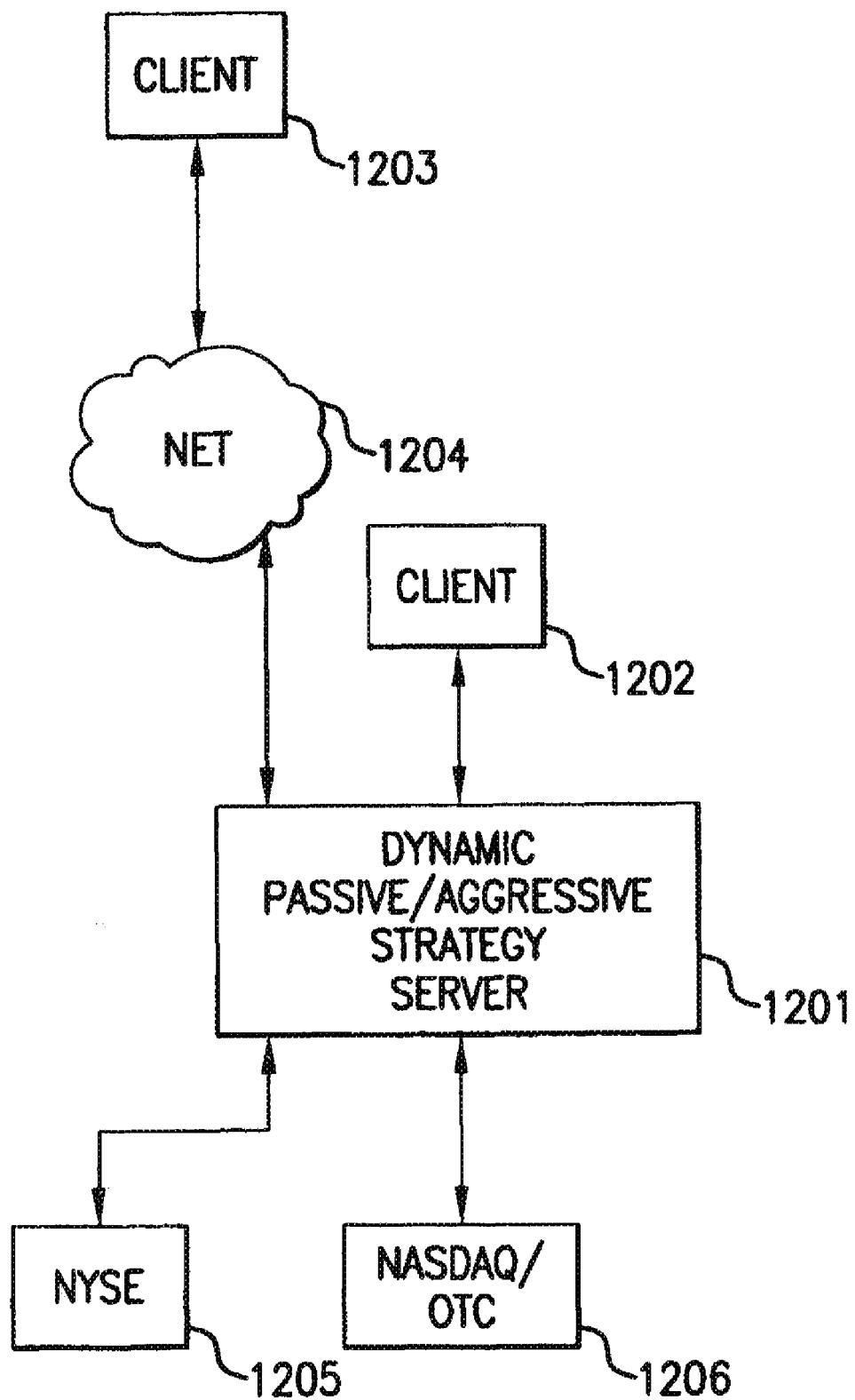
FIG. 12 is a block diagram of a system for implementing the processes shown in FIGS. 1-11.

As shown in FIG. 12, the trading strategy is implemented by a server 1201, which is in communication with various exchanges, such as the New York Stock Exchange 1205, the NASDAQ/OTC market 1206, and other like markets/exchanges. A client 1202 is composed of a PC, workstation or similar device, and may be directed coupled to the server 1201; other clients, such as client 1203, are coupled to the server 1201 through a distributed communication network 1204, which may be the Internet, a Wide Area Network (WAN), a Local Area Network (LAN), or any other similar type of communication network.

Referring now to FIG. 1, the novel trading strategy according to the present invention will be described in detail. At step 1001, an order is received by the server over a communication medium. The order includes a number of parameters including identification of the stock by its trading symbol, the "side" of the trade (i.e., buy or sell), the size of the trade in terms of the number of shares or units of the stock, the price limit, and an indicated "urgency" of the trade. The price limit is optional, and allows the client to specify the maximum/minimum price at which the client is willing to buy/sell the security. The urgency parameter may be submitted either as an urgency level (such as High, Medium or Low) or as a specific time horizon (e.g. 60 minutes) within which the trade is to be completed. The user of the system thus does not have to specify any complicated parameters when submitting the order, but instead needs only to specify the trading names or symbols, side of the trade, size of the trade, price limit (if any) and either urgency or time horizon. Hereinafter, such an order will be referred to as a client order.

At step 1002, the client order size is compared with a preset variable labeled "INIT_MAX_ORDER_SIZE". The value of this variable determines the largest size order that the server will accept. A default value is set at 25,000 shares. If the received order size is greater than the preset value, then the process branches to step 1004. At step 1004, if a variable labeled "INIT_REJECT_OVERSIZED" is set to TRUE, the oversized order will be rejected and sent back to the client. If the variable is set to FALSE, then the oversized order will be bounced to a trading desk for handling by a live trading specialist.

Figure 2:
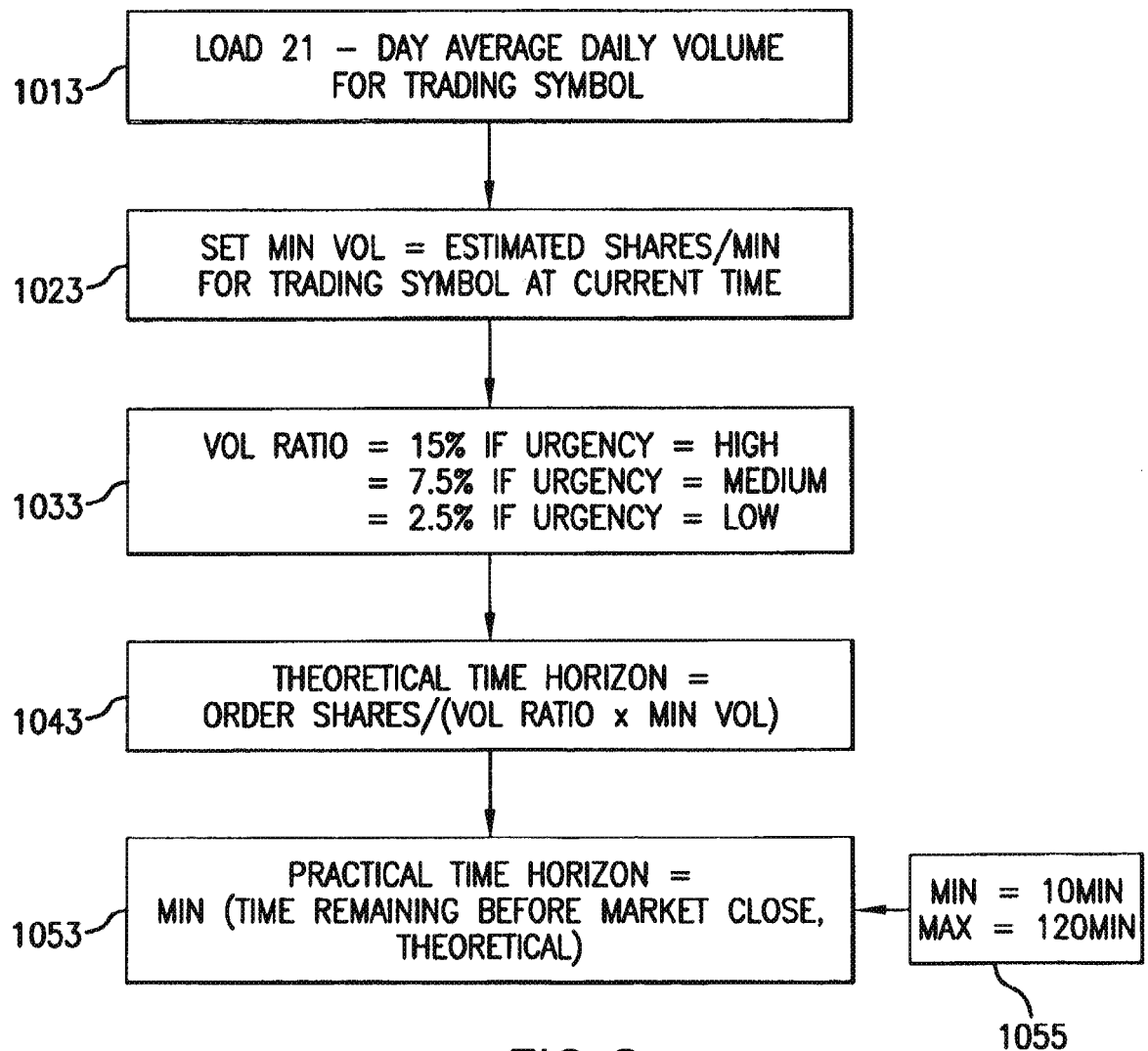
FIG. 2 is a flow diagram of the steps involved in the time horizon calculation step of FIG. 1.

If the order is not oversized, then at step 1003 theoretical and practical time horizons are calculated. The detailed steps involved in these calculations are shown in FIG. 2. At step 1013, the 21-day Average Daily Volume for the specified trading symbol is loaded from a database. The 21-day ADV includes the average daily volume broken down by hour of day.

At step 1023, the variable MinVol is set to be equal to the estimated number of shares per minute traded for the given trading symbol at the current time, based on the data received for the 21-day ADV. At step 1033, the variable VolRatio is set in accordance with the received Urgency parameter. VolRatio represents the desired ratio of shares traded by the server to expected shares traded on the market by others, over the indicated time horizon for the order. This initial ratio is set to 15% if the Urgency entered by the client is High, 7.5% if the Urgency is Medium, and 2.5% if the Urgency is Low.

At step 1043, a Theoretical Time Horizon is calculated to be equal to the number of shares in the order, divided by the product of VolRatio and MinVol. For example, if the number of shares specified in the order is 10,000 and the indicated urgency is High, and the MinVol is determined to be 500 shares per minute, then the Theoretical Time Horizon would be equal to 10,000/(0.15×500)=134 minutes to complete the trade.

At step 1053, a Practical Time Horizon is calculated to be equal to the minimum of the time remaining before market close, or the Theoretical Time Horizon. For example, if the current time is 12:00 p.m., then the time remaining before market close is four hours (240 minutes). In this case, the Practical Time Horizon would be tentatively set to be equal to the determined Theoretical Time Horizon, since that variable is less than the time remaining before market close. However, minimum and maximum values are set for the Practical Time Horizon as shown in step 1055. In the example, the default values are 10 minutes and 120 minutes, respectively. Other default values may be chosen in accordance with "fine-tuning" of the strategy. Thus, since the tentatively calculated Practical Time Horizon exceeds the default maximum, it is set to the default maximum of 120 minutes in the example. In the case where the client enters the Urgency parameter as a time horizon in minutes, then the theoretical time horizon would be set to be equal to the time horizon entered by the client.

Referring back to FIG. 1, at step 1005 it is next determined whether the Theoretical Time Horizon is greater than twice the Practical Time Horizon. If so, it is determined that there is insufficient time left before the close of market for the server to complete the order, and the order will be forwarded to the live trading desk at step 1004. In the example, the Theoretical Time Horizon is only 1.12 times the Practical Time Horizon, the order is acceptable for processing by the server, and the process advances to step 1006 for commencement of pegging and discretion logic operations.

Figure 3A:
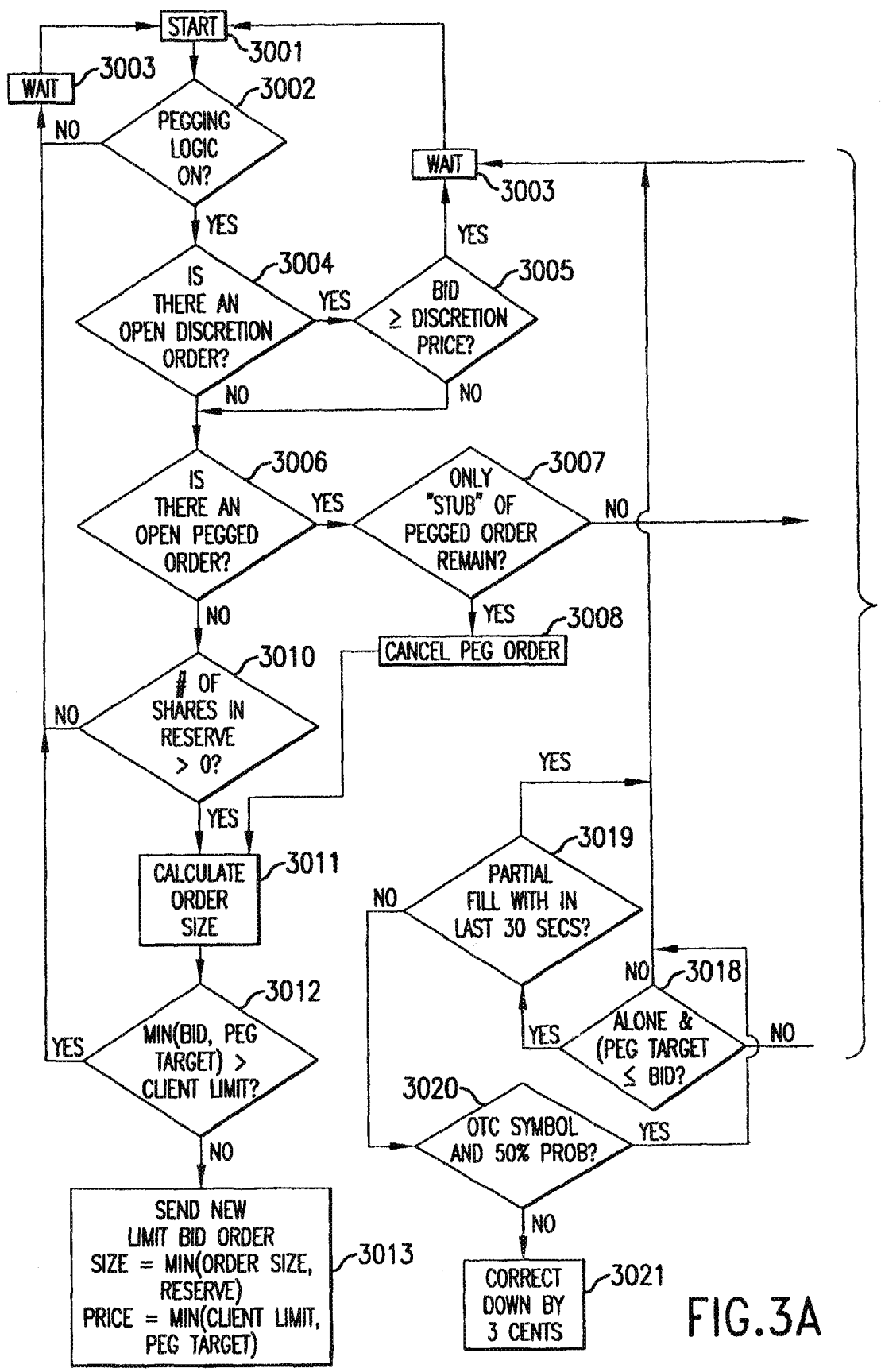
FIG. 3 is a flow diagram of the dynamic Pegging agent strategy according to one preferred embodiment of the present invention.
Figure 3B:
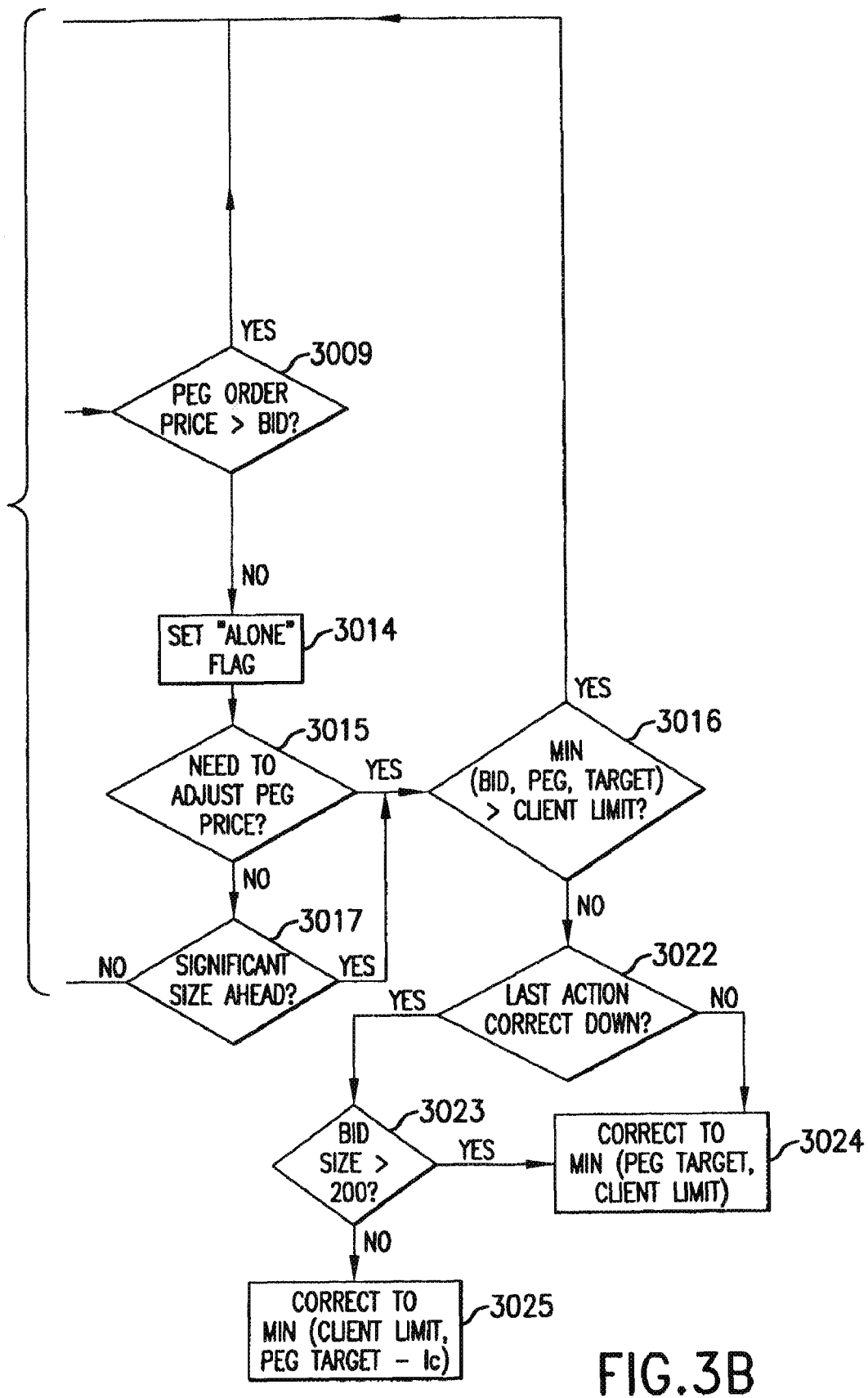

FIG. 3 illustrates a flow diagram of the pegging logic according to one preferred embodiment of the invention. The process is explained using the example of a buy order. For a sell order, the logic would be the same, except the calculations regarding bid/ask values would be reversed. The process is started at step 3001, upon acceptance of an order processed according to FIG. 1. At step 3002, the value of a variable PEG_ON is checked to determine whether the pegging logic has been disabled. The default value is YES, and this parameter can be set to NO, to thereby disable the pegging agent. If the pegging logic is disabled, the pegging portion of the algorithm does not run. The process waits a predetermined amount of time at step 3003 (such as 15-35 seconds) and restarts. The peg interval is computed for each trading symbol and can be set differently based on whether the trading symbol is a liquid or illiquid security (based on the market in which the symbol trades and a predetermined cutoff, such as 1 million shares per day average volume). A randomization factor also may be added to this interval to mask the automated nature of the trading algorithm.

Assuming the pegging logic is enabled, at step 3004 it is determined whether there is an outstanding open discretion order (logic discussed below). The discretion logic is run upon arrival of the accepted client order, and thereafter only as scheduled. If an open discretion order exists, then at step 3005 it is determined whether the current bid is greater than or equal to the discretion order price. If so, the process waits at step 3003 and restarts after the predetermined period of time has elapsed. This allows the open discretion order time to execute.

If the current bid is less than the discretion order price, this means that the discretion order is out in front of the best bid and thus should be executed substantially immediately, and thus is treated as if there is no open discretion order. If the current bid is less than the discretion order price, or no open discretion order exists, then at step 3006 it is determined whether there exists an open pegged order. If no open pegged order exists, then at step 3010 it is determined whether the number of shares in reserve is greater than zero. The reserve shares are the unfilled and unsent shares of the client order allocated to be traded.

In this regard, a limitation may be imposed on the speed of trading to prevent the algorithm from trading too many shares too soon. This limitation is set by specifying a value of a variable labeled "INIT_TRADE_FAST". The default value is set to 100%. This means that no limitation is imposed on the speed of trading. The default value can be changed to be between 0% and 100%. If the variable is set to less than 100%, trading can be slowed down to avoid getting too far ahead of schedule. For example, if it is desired not to allow trading to get ahead of schedule at all, INIT_TRADE_FAST would be set to 0%. The reserve shares are calculated as Target Size× MIN(100%, (Elapsed Time/Time Horizon+INIT_TRADE_FAST)) less any shares that have already filled or that have been sent and are currently outstanding. The Target Size is the client order size. Thus, if INIT_TRADE_FAST=0% and 30 minutes have elapsed in a 120 minute horizon, then the reserve shares would be calculated to be Target Size×(30/120+0%)=Target Size×25%. In this instance, the algorithm constrains itself to have no more than 25% of the client order sent (or completed).

If the reserve shares as calculated are zero, the process waits at step 3003 and then restarts at the predetermined time interval. If the reserve shares are greater than zero, then a new peg order is built. At step 3011 the peg order size is calculated. First, a base order size is determined with the objective of blending into the current market without attracting attention from other participants. For listed trading symbols, the base order size default is ⅔ the typical (i.e. historical average) bid size, subject to a base size floor (such as 500 shares) and a base size ceiling (such as 10,000 shares). For OTC symbols, the base order size is calculated to be equal to MIN(Target Size×25%, 20×(Target Size/Time Horizon)), subject to the same base size floor and ceiling constraints. The 25% factor represents an OTC target variable, and the 20 factor represents an OTC minutes variable. The calculated base size then can be randomized by adding or subtracting a predetermined percentage of the base size from the calculated base size.

The process then advances to step 3012, wherein it is determined whether the minimum of the current bid or peg target price is greater than the limit price specified by the client. If this is the case, the process returns to step 3003 to wait for the elapsed time interval to restart. Otherwise, a new limit bid order is sent (assuming that the calculated size of the peg order is greater than zero), where the size of the peg order is the minimum of the calculated peg order size or the reserve shares, and the price is the minimum of the client limit price or the peg target. Initially, the peg target price is assumed to be the bid; however the peg target may be dynamically calculated to implement one of a family of different strategies. For example, the peg target may be the midpoint between bid and ask, or be opportunistically set in front of the best bid.

Figure 4:
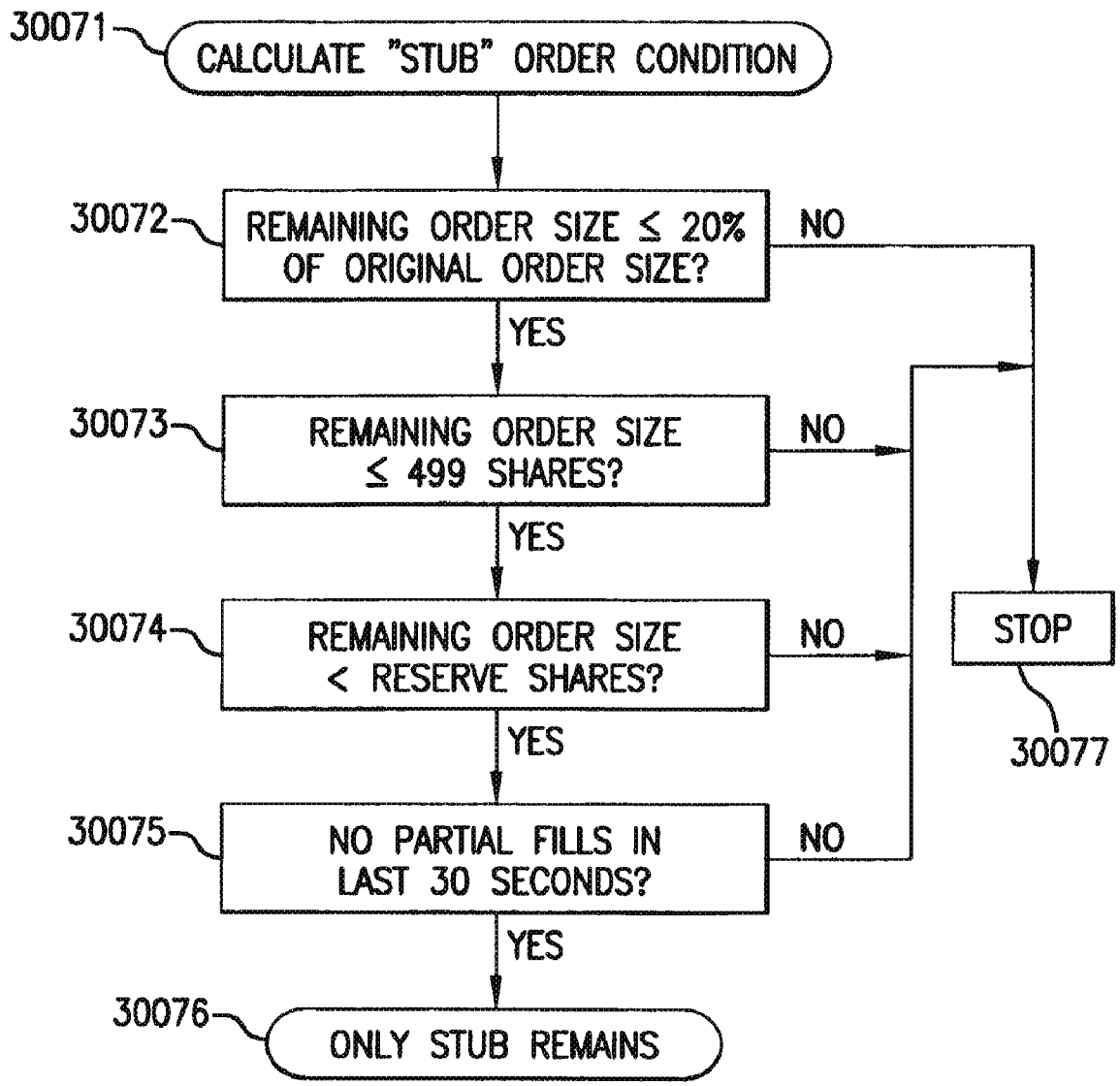
FIG. 4 is a flow diagram of the steps involved in the "stub order" calculation of FIG. 3.

If it is determined at step 3006 that an open pegged order exists, then at step 3007 it is determined whether it is only a "stub" of the original peg order size. A "stub" order results when a previously-issued peg order has been almost but not completely filled, leaving only a small "stub" of the original peg order still open. As shown in FIG. 4, at step 30071 the stub order calculation is initiated. At step 30072 it is determined whether the remaining peg order size (after partial fills) is less than or equal to 20% of the original peg order size. If not, more than a stub remains, and the calculation is stopped at step 30077. If so, then at step 30073 it is determined whether the remaining peg order size is less than 500 shares (less than or equal to 499 shares). If not, the calculation is stopped at step 30077. If so, the process continues to step 30074 where it is determined whether the remaining peg order size is less than the reserve shares (as calculated using the INIT_TRADE_FAST variable factor). If not, the process ends at step 30077. If so, at step 30075 it is determined whether any partial fills have occurred in the last 30 seconds. If so, the calculation is stopped at step 30077, because if partial fills have recently occurred, the order will not be considered a "stub". If not, then it is determined that only a stub order remains, at step 30076. It is noted that the 20% original order, 499 share, and 30 second partial fill parameters are adjustable variables and are set in advance of program execution.

Figure 5:
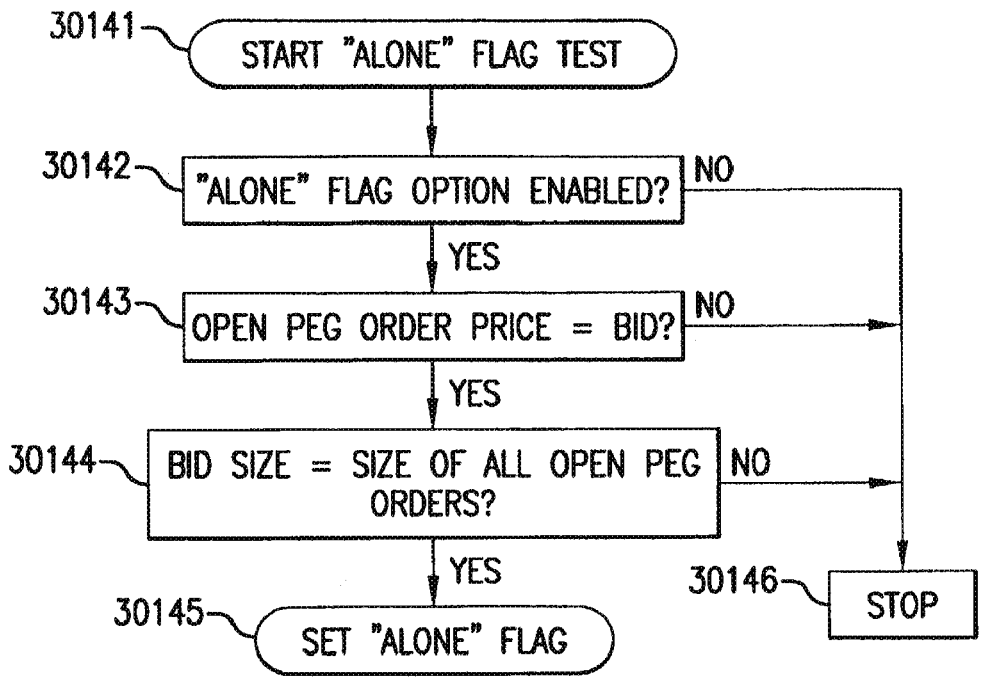
FIG. 5 is a flow diagram of the steps involved in the "alone flag" calculation of FIG. 3.

If only a stub order remains, then at step 3008 the open peg order is cancelled, and a new peg order size is calculated at step 3011 (wherein the base order size may be randomly adjusted by a predetermined percentage). If it is determined that the open peg order is not a "stub" order, then at step 3009 it is determined whether the existing peg order price exceeds the current bid. If so, the process does nothing (as the result of the inference when existing peg order price exceeds current bid that the observed quotes are stale and have not yet been updated), advances to step 3003 to wait for the predetermined time interval to elapse and then restarts. If the peg order price does not exceed the current bid, then it is determined at step 3014 whether the peg order is "alone: on the market (i.e. there are no other orders at the peg order price (bid); in other words, the best bid equals the peg order price, and the size of the best bid equals the size of the peg order). The alone flag test is started at step 30141 as shown in FIG. 5.

At step 30142 it is determined whether the alone flag option is enabled. This is determined by checking the value of the variable labeled "ALONE_FLAG." The default value is TRUE. By setting the value to FALSE, the trading program never considers withdrawing when it is alone at the bid. Such a strategy would be needed, for example, where the peg target was set at ASK–N cents. If ALONE_FLAG is disabled, the routine ends at step 30146. If enabled, at step 30143 it is determined whether the open peg order price is equal to the bid. If not, the peg order is not considered alone and the routine ends. If the open peg order price is equal to the bid, then at step 30144 it is determined whether the size of the bid is equal to the size of all the open peg orders on the server for all orders of the same side at the same price for all customers. If so, the alone flag is set at step 30145. If not, the flag is not set and the alone flag process ends at step 30146.

Figure 6:
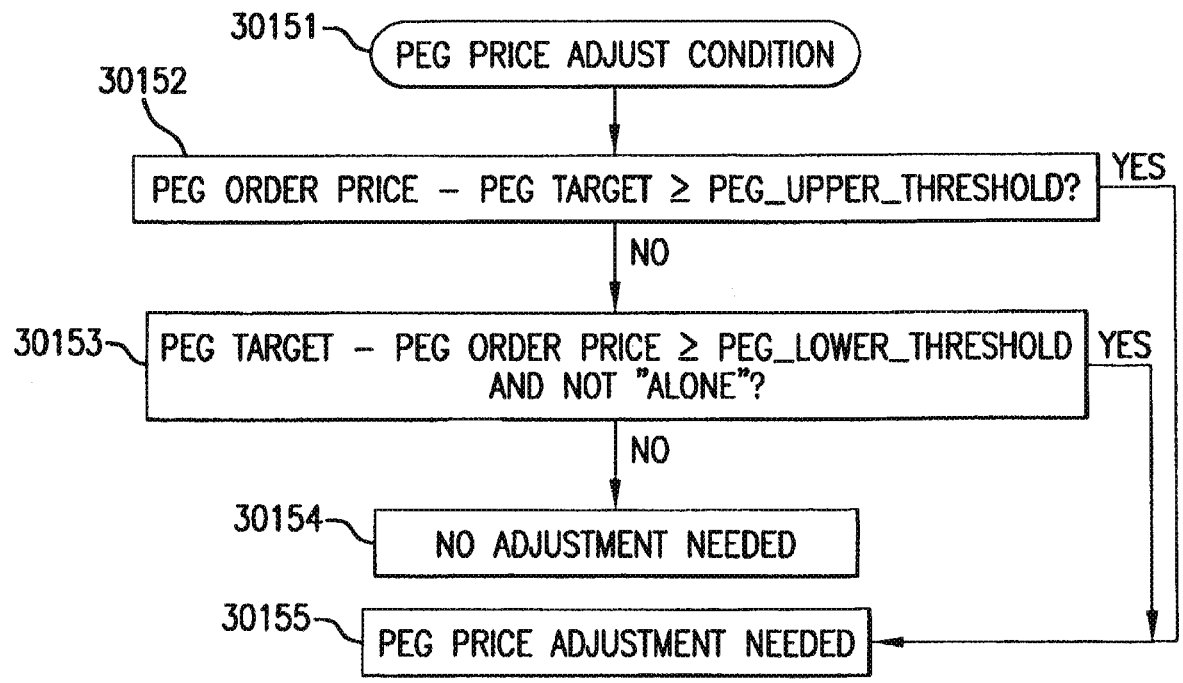
FIG. 6 is a flow diagram of the steps involved in the peg order price adjustment calculation of FIG. 3.

The process then proceeds to step 3015 for determination of the need to adjust the peg order price. This calculation starts at step 30151 as shown in FIG. 6. At step 30152 it is determined whether the peg order price (i.e., the price of our outstanding peg order) minus the peg target price is greater than or equal to the PEG_UPPER_THRESHOLD, which defines the smallest distance between the peg order price and the peg target (where the peg order price is some distance above the peg target) wherein the order price would always be corrected. At step 30153 it is determined whether the peg target price minus the peg order price is greater than or equal to the PEG_LOWER_THRESHOLD, and the peg order is not "alone." If the peg target price minus the peg order price (where the peg order price is some distance below the peg target) is greater than or equal to the PEG_LOWER_THRESHOLD and the peg order is not alone, then an adjustment to the peg order price is needed. Otherwise, it is determined that no adjustment is needed. Similarly, if peg order price minus the peg target price is greater than or equal to the PEG_UPPER_THRESHOLD, then an adjustment to the peg order price is needed. The upper and lower threshold parameters have a default value of 2 cents. Thus, as a result of the adjustment determination, it is determined whether the pegged order priced at a deviation from the peg target (either positively or negatively) will be corrected.

If it is determined at step 3015 that no price adjustment is needed, then at step 3017 it is determined whether there exists a "significant size" order ahead of the peg order. The existence of a significant size ahead of the peg order will cause the pegged order to be corrected notwithstanding the fact that the pegged order is within the peg correction threshold amount (positive or negative) of the target price.

Figure 7:
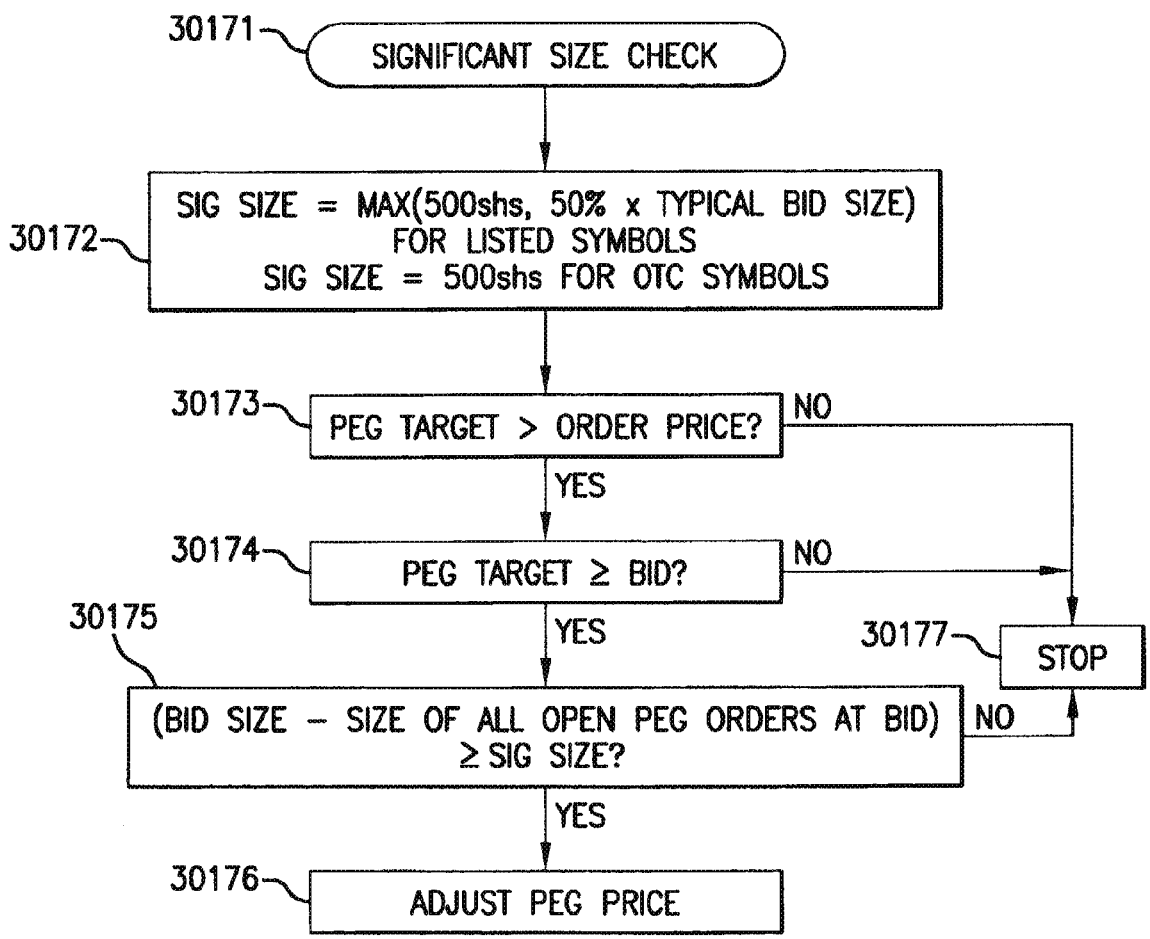
FIG. 7 is a flow diagram of the steps involved in the "significant size" calculation of FIG. 3.

At step 30171 of FIG. 7, the process initiates a significant size check. At step 30172, the SigSize variable is set to the maximum of 500 shares or 50% of the typical bid size for listed trading symbols, and for OTC trading symbols, SigSize is set to 500 shares. At step 30173, it is determined whether the Peg Target is greater than the peg order price. If it is, the process advances to step 30174 to determine whether the Peg Target is greater than or equal to the current bid. If the Peg Target is not greater than the outstanding peg order price, and not greater than or equal to the bid, then no price adjustment is needed, and the routine is stopped at step 30177.

If at step 30174 it is determined that the Peg Target is greater than or equal to the current bid, then at step 30175 it is determined whether the size of the current bid minus the size of all open peg orders on the server at the bid is greater than the pre-set value of SigSize. If so, then peg order price adjustment is needed and at step 30176 processing advances to step 3016 (FIG. 3) for price adjustment as explained below.

If there is no significant size ahead of the open peg order, then at step 3018, it is determined whether the "alone" flag is set and the Peg Target is less than or equal to the bid. If this condition is false, then the process returns to step 3003 to wait for expiration of the predetermined time interval to restart (the false result means that the peg order is either not alone at the bid, or that the peg order is alone but the peg target is intentionally set to be in front of the bid). If this condition is true, then at step 3019 it is determined whether any partial order fills have occurred within the last 30 seconds. The reasoning behind this logic is that when the peg order is alone at the inside market, correcting away may be desirable. However, no correcting away will be performed if recent partial fills have been received. A variable labeled "ALONE_TIME_CONDITION" is set to a value in seconds which defines what is considered "recent."

If no recent partial fills have been received, then at step 3020 it is determined whether the order is for an OTC trading symbol, and if so a random probability factor is used (default 50%) to decide whether to do nothing. The introduction of the probability factor takes into account the fact that for OTC symbols, the quote data does not always provide accurate numbers for depth at the top of the market. The probability factor is not used where the order is for a listed trading symbol.

At step 3021, it has been determined that the open peg order is alone at the bid, and therefore it is desirable to correct the peg order away from the bid. The default ALONE_CORRECT_AWAY value is 3 cents, but may be set to any desired value and also can be randomized upon each instance of this step.

If at steps 3015 or 3017 it is determined that the peg order price needs to be adjusted, then it is determined at step 3016 whether the minimum of the bid and peg target exceeds the client price limit. If it does, no correction is made, and the process stops and waits to restart at step 3003. If it does not, then at step 3022 it is determined whether the last action taken by the pegging algorithm was to correct the peg order price down. If the last action corrected the price down, then at step 3023 it is determined whether the current bid size exceeds 200 shares. If yes, then the peg order price is corrected at step 3024 to the minimum of the peg target (i.e. bid) or the client limit. If no, then the peg order price is corrected at step 3025 to the minimum of the client limit or the peg target (bid) minus 1 cent. If the determination at step 3022 is negative, then the peg order price is corrected as at step 3024.

The 200 share comparison and the 1 cent differential are default values that may be changed. Steps 3023 and 3025 function to prevent "whipsaw" corrections, which occur when the following sequence happens: 1) the peg order is alone at the bid and a correction of 3 cents away from the bid is made; 2) the specialist posts 100 shares to replace the old bid; 3) after 30 seconds, the peg order is corrected back to the original price; 4) the specialist withdraws the quote, leaving the peg order alone at the bid, which invokes step 1 to be repeated ad infinitum. To prevent this, whenever the pegged order is corrected to a more aggressive price, it is checked to see if the last action was a correct-away. If it was, and there is no "significant size" order ahead of the peg order (default 200 shares), then the price of the peg order is corrected to just beyond the inside market.

Figure 8:
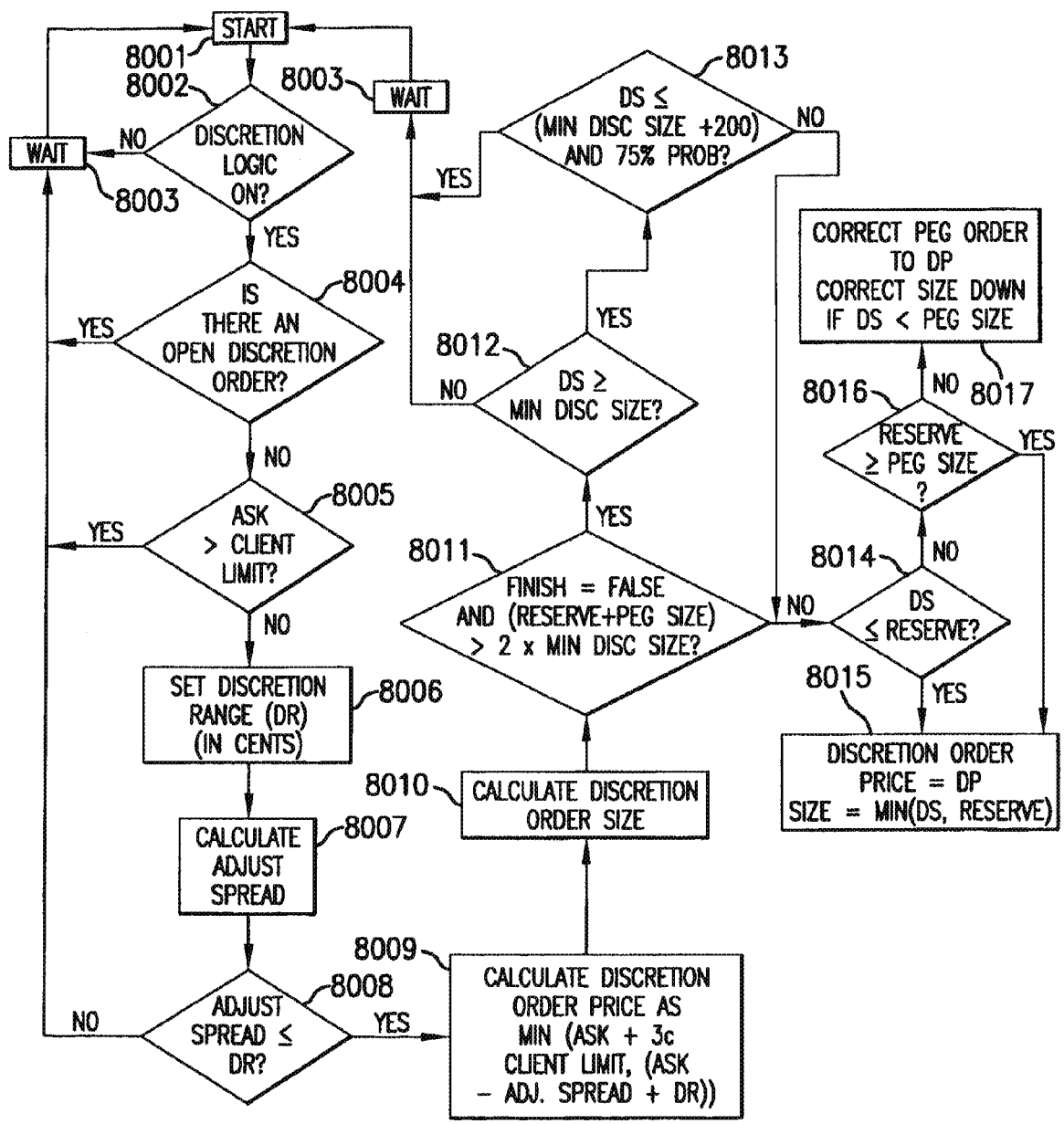
FIG. 8 is a flow diagram of the dynamic Discretion agent strategy according to one preferred embodiment of the present invention.
Figure 9:
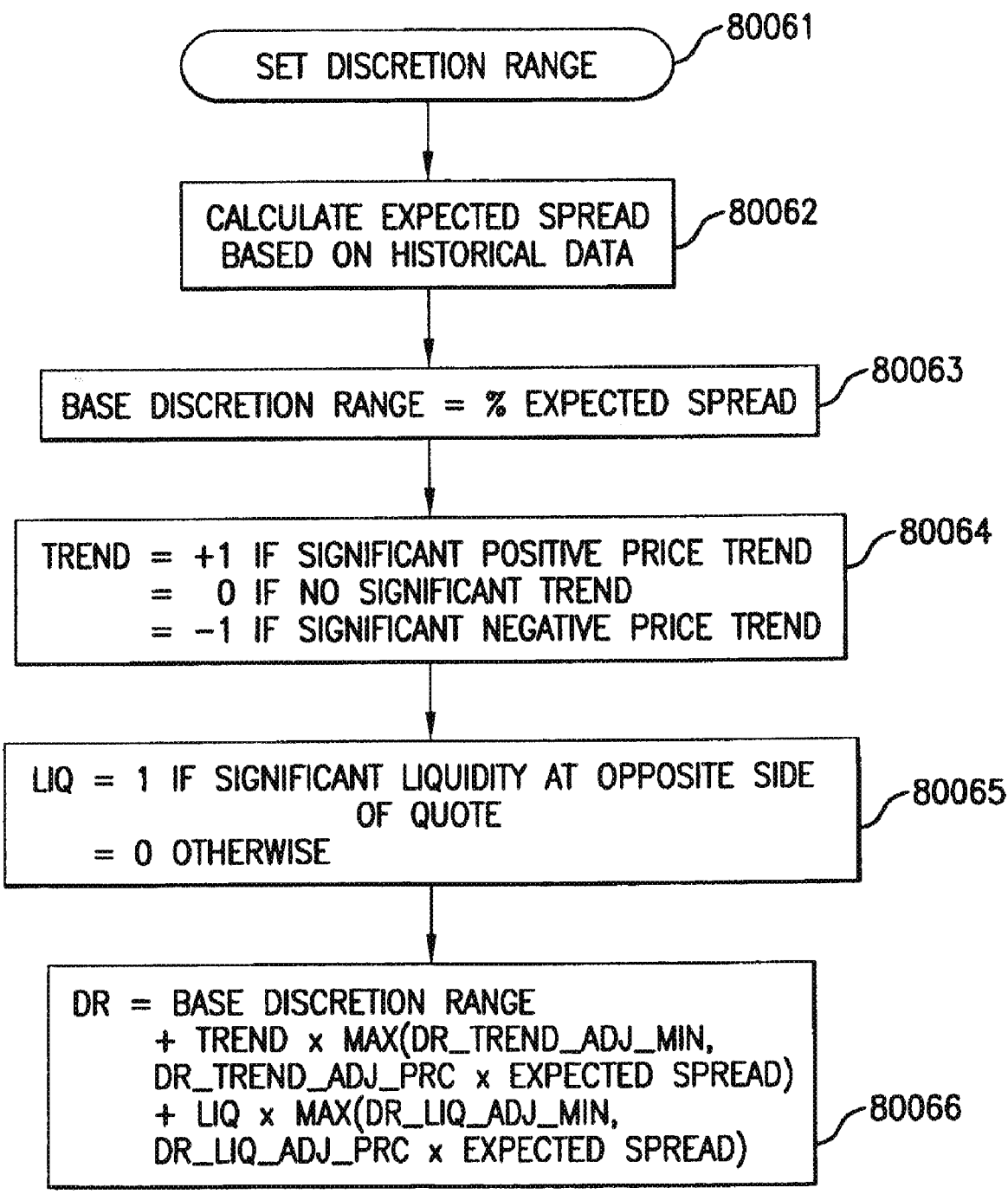
FIG. 9 is a flow diagram of the steps involved in the discretion range calculation of FIG. 8.

FIG. 8 is a flow diagram explaining the discretion agent logic. The discretion agent is run upon acceptance of the client order by the initial logic routine, and thereafter when scheduled after elapse of a predefined period of time (such as 5 seconds). After initialization of the agent at step 8001, at step 8002 it is determined whether the discretion order logic is desired to be performed by checking the value of the DISC_ON parameter (default=YES). If not turned on, the discretion logic will not run. The process waits until expiration of the predefined time period at step 8003 and then resets at step 8001. If the discretion order logic is turned on, then at step 8004 it is determined whether an open discretion order already exists. If so, the logic waits at step 8003 to be restarted. If no open discretion order exists, then it is determined whether the current ask is greater than the specified client limit, at step 8005. If so, then it is not possible to place a discretion order, and the logic returns to wait mode. If the ask is not above the client limit, then the discretion range (in cents) is set at step 8006. The details of the discretion range setting routine is shown in FIG. 9.

At step 80061, the routine is initialized. At step 80062, the expected spread (i.e., ask−bid) for the trading symbol is calculated based on historical data (which is obtained from a database). At step 80063, a base Discretion Range is set to a percentage of the expected spread, based on the following table:

|  | CPM | | | | | |
| --- | --- | --- | --- | --- | --- | --- |
| BS | <=25% | 25-50% | 50-75% | 75-100% | 100-200% | >200% |
| <0% (ahead) | MIN | 50% x ES | 75% x ES | 100% x ES | 100% x MXES | 150% x MXES |
| <50% behind | 50% x ES | 75% x ES | 100% x ES | 150% x MXES | 150% x MXES | 200% x MXES |
| >=50% behind | 75% x ES | 100% x ES | 100% x MXES | 150% x MXES | 200% x MXES | 200% x MXES |

Where CPM = "Chunks" Remaining per Minute = [(Target Shares − Filled Shares)/(EFFECTIVE_TIME_HORIZON − UNBLOCKED ELAPSED TIME)]/ChunkSize
BS = % Behind Schedule = (UNBLOCKED_ELAPSED_TIME/EFFECTIVE_TIME_HORIZON) − (Filled Shares/Target Shares)
UNBLOCKED_ELAPSED_TIME = time now − client order arrival time − TIME_BLOCKED
TIME_BLOCKED = the number of minutes that have elapsed so far where the strategy has been prevented from trading by the client limit price
EFFECTIVE_TIME_HORIZON = MIN(Time Horizon, TOTAL_TIME_REMAINING + UNBLOCKED_ELAPSED_TIME)
TOTAL_TIME_REMAINING = MIN(Client Order Arrival Time + INIT_MAX_TIME_HORIZON, Today's Market Close Time) − Time Now
ES = Expected Spread (based on historical data)
MXES = MAX (ES, ESP, EST)
ESP = Expected Spread Prior (based on today's and short-term historical data)
EST = Expected Spread Today (based on historical and today's prior spread data)

Each column contains a range of values for CPM, the number of "chunks" of shares that need to be traded per minute remaining in the schedule. Each "chunk" is a quantity of shares that is considered as capable of being traded in approximately one minute without resulting in significant market impact, and is calculated based on a model using parameters such as historical average daily volume, recent depth, liquidity, etc.

Next, market urgency is reflected by a variable called TREND at step 80064. If there is a significant positive price trend (as determined using a short-term price trend model), then TREND is set to +1; if there is no significant price trend, then TREND is set to 0; and if there is a significant negative price trend, then TREND is set to −1. The liquidity flag LIQ (step 80065) takes on a value of 1 if there is significant liquidity at the opposite side of the quote ("significant" being defined by a predetermined value); otherwise LIQ is set to zero.

The final Discretion Range (DR) is then calculated at step 80066 in accordance with the given equation. The variables DR_TREND_ADJ_MIN and DR_LIQ_ADJUST_MIN define the minimum number of cents that can be added to (or subtracted from) the base discretion range based on the value of the TREND variable and the LIQ flag, while the DR_TREND_ADJUST_PRC and DR_LIQ_ADJUST_PRC variables define the percentage of expected spread that is to be added/subtracted to/from the base discretion range. Similar constraints can be placed on maximum amounts that can be added to or subtracted from the base discretion range. It is here reiterated that in contrast to the prior art discretion order, the present invention provides a dynamic discretion range that is calculated automatically for each trading symbol and adjusted in accordance with real-time market conditions.

Figure 10:
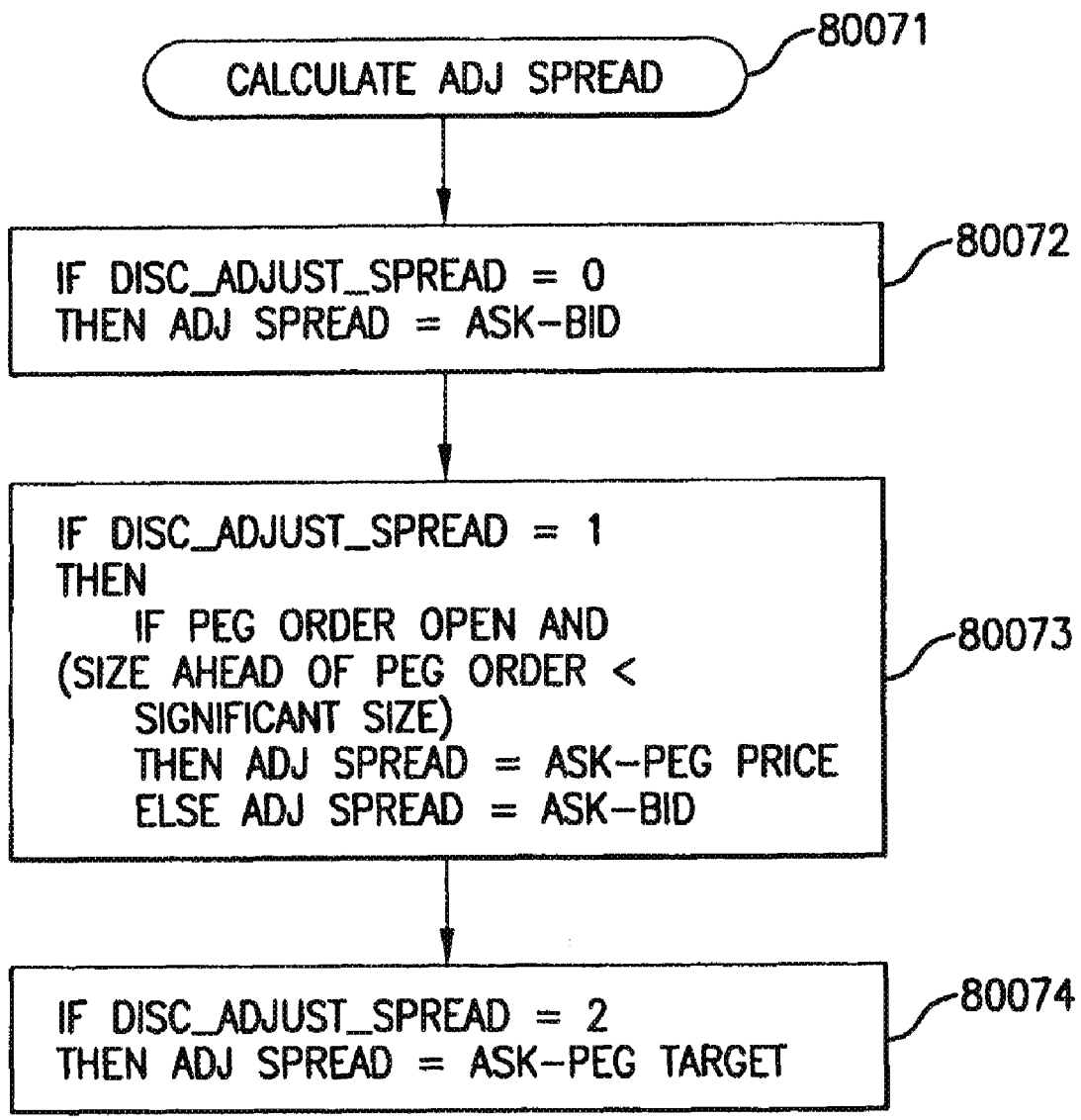
FIG. 10 is a flow diagram of the steps involved in the spread adjustment calculation of FIG. 3.

After the discretion range DR is calculated at step 8006, whether and how to adjust the calculation of the spread for purposes of the discretion order logic is determined at step 8007. The adjust spread routine is initialized at step 80071 as shown in FIG. 10. A flag labeled DISC_ADJUST_SPREAD can have one of three values, 0, 1 or 2. If the flag is set to 0, at step 80072 the adjusted spread AdjSpread is considered to be the ask−bid. If the flag is set to 1, at step 80073 AdjSpread is considered to be the ask−peg order price, if there is an open peg order and the size of all orders ahead of the open peg order is less than the Significant Size (as defined in the pegging agent logic). Otherwise, AdjSpread is considered to be the ask−bid. If the flag is set to 2, then at step 80074 the AdjSpread is considered to be the ask−Peg Target.

After the discretion range DR and AdjSpread values are calculated, at step 8008 it is determined whether AdjSpread is less than or equal to DR. If the adjusted spread is greater than the discretion range, then no discretion order will be placed, and the logic waits at step 8003 for expiration of the predefined time interval to restart. If the adjusted spread is less than or equal to the discretion range DR, then a discretion order will be assembled.

At step 8009, the price of the discretion order is determined to be the minimum of the current ASK plus 3 cents (where 3 cents represents an adjustable value of a variable labeled DISC_PRICE_THROUGH), the specified client limit, or the current ASK minus the AdjSpread plus the discretion range DR. This calculation allows a discretion order to be priced through the inside market, so long as it does not violate the client's price limit or the calculated discretion range DR.

Figure 11:
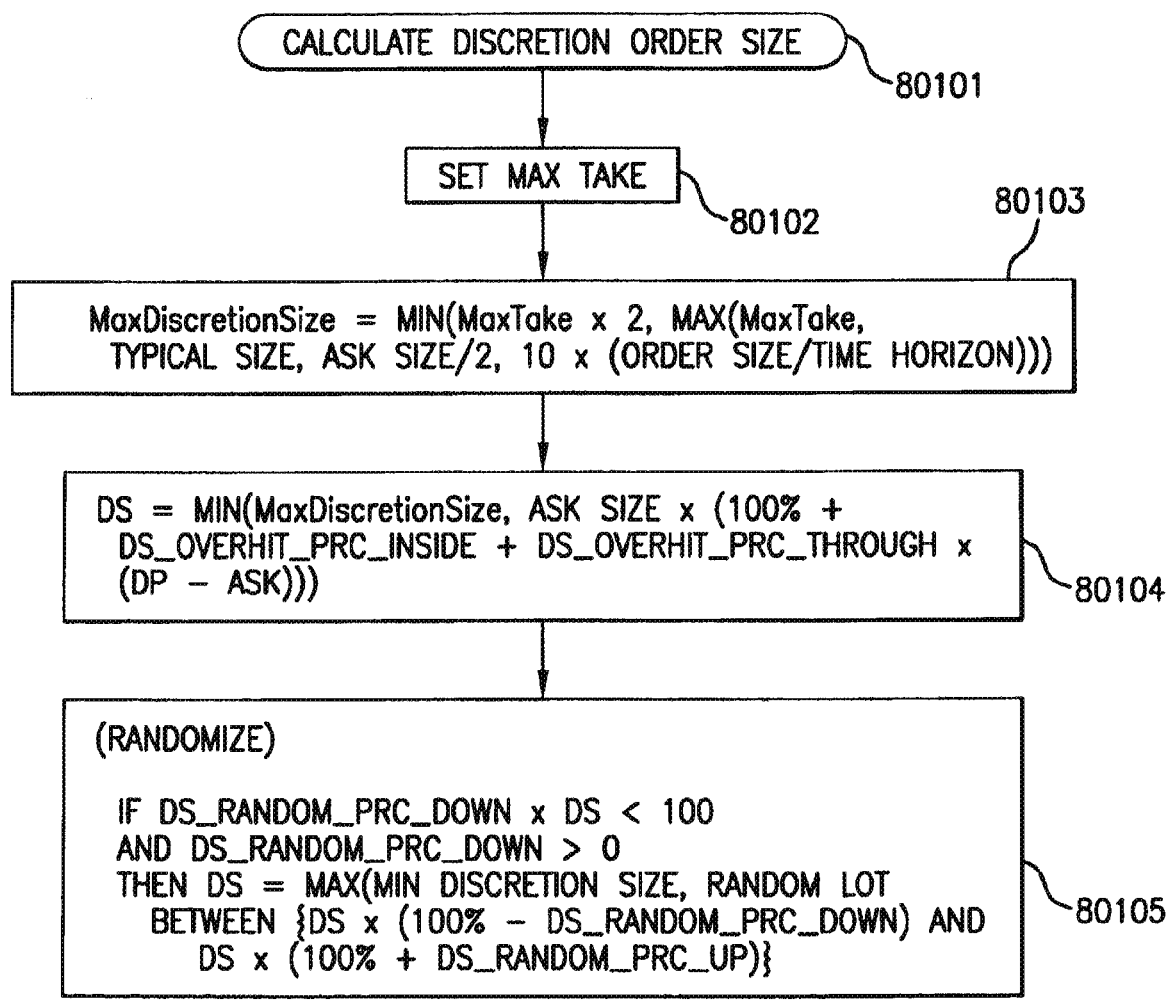
FIG. 11 is a flow diagram of the steps involved in the discretion order size calculation of FIG. 3.

After the price of the discretion order is calculated, the size of the discretion order is calculated at step 8010. The details of this calculation are shown in FIG. 11. At step 80101, the routine is initialized. At step 80102, the value of the variable MaxTake is set. The value of MaxTake is based on the ADV (Average Daily Volume) of the trading symbol. For ADV over 20 million shares, MaxTake is set to 8,000 shares; for ADV between 5 and 20 million shares, MaxTake is set to 5,000 shares; for ADV between 1 and 5 million shares, MaxTake is set to 4,000 shares; and for ADV less than 1 million shares, MaxTake is set to 3,000 shares.

Next, at step 80103, a maximum discretion size is calculated as the minimum of two values: MaxTake×2; or the maximum of MaxTake, TypicalSize (as determined by historical data), one-half the current ask size, or 10 times the total client order size divided by the time horizon. After the MaxDiscretionSize is calculated, the discretion size DS is calculated at step 80104.

As shown, the discretion size DS is calculated to be the minimum of two values: the previously determined MaxDiscretionSize, or a value determined by the settings of variables DS_OVERHIT_PRC_INSIDE and DS_OVERHIT_PRC_THROUGH. These variables control whether or not an oversized discretion order (i.e., an order larger than the displayed depth at the ask) may be placed under certain circumstances. For example, without oversizing of the discretion order, where the discretion range DR is 4 cents, the spread is 1 cent, and 100 shares are displayed on the ASK, the discretion agent logic would only consider placing a 100 share discretion order. The oversizing analysis allows the possibility of placing a larger-sized discretion order where the discretion order may be priced through the ASK (e.g., 3 cents through the ASK in the example). It is noted, however, that as indicated in the equation of step 80104, the oversizing calculation will not result in discretion orders any larger than the maximum order size generated by the MaxDiscretionSize calculation. The default values for DS_OVERHIT_PRC_INSIDE and DS_OVERHIT_PRC_THROUGH are 0% and 50%, respectively. Using the default values in the equation of step 80104, it will be seen that the discretion size DS potentially could be increased to a percentage over the current ask size as determined by the difference between the discretion price and the ask, subject to an upper size limit defined by MaxDiscretionSize.

After the discretion size DS is determined, it is subjected to a randomization process in step 80105, wherein DS may be randomized slightly up or down depending upon the set values of variables DS_RANDOM_PRC_DOWN and DS_RANDOM_PRC_UP. The default values for these variables are 10% and 0%, respectively. According to the randomization generator, a random round lot value (i.e., a multiple of 100 shares) would be chosen between a lower bound of DS×(1−DS_RANDOM_PRC_DOWN) and an upper bound of DS×(1+DS_RANDOM_PRC_UP). The final discretion size DS will be determined to be the maximum of the randomly chosen size within the constraints above, or a minimum discretion order size specified by the client as reflected in the value of the variable DS_MIN_DISC_SIZE (which is the same as MinDiscretionSize in the equation of step 80105).

After the suggested discretion order price and suggested discretion order size have been determined, at step 8011, it is determined whether a FINISH flag is set to TRUE or FALSE, and whether the sum of the reserve shares and the peg order size is greater than twice the MinDiscretionSize. If the FINISH flag is set to TRUE or the reserve shares plus the peg order size is less than twice the MinDiscretionSize, processing branches to step 8014. If FINISH=FALSE and the reserve shares plus the peg order size is more than twice the MinDiscretionSize, then it is determined at step 8012 whether the calculated discretion size DS is greater than or equal to the MinDiscretionSize. If it is not, this means that the calculated discretion order size is less than the minimum size specified by the client, and thus the process proceeds to wait at step 8003 and restarts after the expiration of the predefined time interval.

If DS is at least equal to the MinDiscretionSize, then at step 8013 a behavior randomization is performed to mask any attempt by other participants to discern the existence of the automated strategy trading agent. Specifically, using a default random probability setting of 75%, if the size of the suggested discretion order DS is at least equal to the specified minimum discretion size, but is less than 201 shares greater than the specified minimum size, then a 75% random chance exists that the discretion agent will do nothing, and not send a discretion order. The "75% Prob" refers to a variable labeled DS_MIN_DISC_SIZE_RANDOM_PRC and signifies the operation of a random decision process that 75% of the time will do nothing, and 25% of the time will place the discretion order. It is noted that when the FINISH flag is TRUE steps 8012 and 8013 will be bypassed.

Next, at step 8014 it is determined whether the suggested discretion size DS is less than or equal to the amount of reserve shares (as defined above). If DS is greater than the reserve shares, and the reserve shares are less than the peg order size as determined in step 8016, then a discretion order is not sent, but instead at step 8017 the open peg order price is corrected to the suggested discretion order price DP, and the size of the open peg order is corrected down if the suggested discretion order size DS is less than the peg size.

On the other hand, if either the suggested discretion order size DS is less than or equal to the reserve shares, or the reserve shares are at least equal to the peg size, then a discretion order is assembled at step 8015, with a price set at the suggested discretion order price DP as determined at step 8009, and a size set to the minimum of the suggested discretion order size DS as determined according to FIG. 11 or the reserve shares (in other words, the size of the discretion order cannot exceed the number of shares remaining in the unfilled portion of the client order).

After the discretion order is sent in step 8015, or the peg order is corrected at step 8017, the discretion agent logic waits N seconds before re-running. The value of N is determined according to the following table:

|  | Small Order | Large Order |
| --- | --- | --- |
| Liquid Trading Symbol | 10 sec | 20 sec |
| Non-liquid Trading Symbol | 20 sec | 30 sec |

If the discretion order is completely filled, then the discretion agent logic waits N seconds as determined according to the following table:

|  | Small Order | Large Order |
| --- | --- | --- |
| Liquid Trading Symbol | 1 sec | 1 sec |
| Non-liquid Trading Symbol | 20 sec | 30 sec |

Note that both tables are consulted simultaneously to determine the value of N. In other words, if a small order for a liquid trading symbol is sent and filled within 10 seconds, the logic waits at least 10 seconds before re-running.

As explained above, the definition of "liquidity" can be set in advance, and is usually defined to mean trading symbols that trade at least an average of 1 million shares per day.

Unfilled discretion orders automatically are cancelled after a specified time interval has elapsed, according to the following table:

| Average Daily Volume | Unfilled Discretion Order Cancel Time |
| --- | --- |
| 1+ million | 20 sec |
| 250K to 1 million | 60 sec |
| <250K | 120 sec |

The values in the tables of course may be changed according to individual strategy.

According to the invention as described, the peg order agent continuously sends out passive pegged orders in an attempt to attract market orders, while the discretion order agent works in tandem with the peg order agent and sends out aggressively priced discretion orders to take advantage of liquidity and to the keep the client's order trading on schedule so as to be completed within the specified time horizon.

The invention being thus described, it will be apparent to those skilled in the art that the same may be varied in many ways without departing from the spirit and scope of the invention. Any and all such modifications are intended to be included within the scope of the following claims.

The invention claimed is:

1. A computer-implemented method of trading a security with a peg order, comprising the steps of:
   receiving by a computer a client request to trade a specified number of shares of a specified security;
   receiving by the computer, data for a current market quote for said specified security;
   forming by the computer, a first electronic trade order to buy or sell said security, said first electronic trade order including a peg order price being correlated to said current market quote for said security;
   sending said first electronic trade order to a electronic trading forum where shares of said security are matched and traded electronically;
   periodically determining whether said current market quote has changed;
   if said current market quote has changed, determining if said peg order price needs adjusting;
   upon determination of a need for adjustment, calculating, by the computer, a new peg order price according to predetermined trading criteria for said security, wherein said predetermined trading criteria comprises a consideration of the direction of a previous peg order price correction; and
   sending a second electronic trade order having said new peg order price to said trading medium to replace said first electronic trade order.

2. The computer-implemented method as set forth in claim 1, wherein said step of forming a first electronic trade order further comprises the step of calculating an order based on historical trading data for said security, and said first electronic trade order is formed to include the calculated size.

3. The computer-implemented method as set forth in claim 1,
   wherein said step of determination of a need for peg order price adjustment comprises determining whether a difference between the price of the first electronic trade order and the current quote exceeds a predetermined threshold value.

4. The computer-implemented method as set forth in claim 1,
   wherein said determination of a need for price adjustment comprises the step of determining whether depth ahead of said first electronic trade order is greater than or equal to a predefined threshold size.

5. The computer-implemented method as set forth in claim 1,
   wherein said predetermined trading criteria comprises a consideration of same-side depth for said specified security when a previous peg order price correction was in a passive direction.

6. The computer-implemented method as set forth in claim 1,
   wherein the step of calculating a new peg order price comprises the step of adjusting said peg order price when said first electronic trade order is alone at the inside market.

* * * * *